(12) United States Patent
Hotta et al.

(10) Patent No.: US 9,582,772 B2
(45) Date of Patent: Feb. 28, 2017

(54) INFORMATION RETRIEVAL DEVICE, INFORMATION RETRIEVAL METHOD, AND NON-TRANSITORY COMPUTER-READABLE RECORDING MEDIUM

(71) Applicant: YAHOO JAPAN CORPORATION, Tokyo (JP)

(72) Inventors: Toru Hotta, Tokyo (JP); Yukihiro Tagami, Tokyo (JP); Shingo Hoshino, Tokyo (JP); Yusuke Tanaka, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 264 days.

(21) Appl. No.: 14/319,701

(22) Filed: Jun. 30, 2014

(65) Prior Publication Data

US 2015/0113003 A1 Apr. 23, 2015

(30) Foreign Application Priority Data

Oct. 17, 2013 (JP) .................... 2013-215927

(51) Int. Cl.
*G06F 17/30* (2006.01)
*G06Q 10/00* (2012.01)

(52) U.S. Cl.
CPC ....... *G06Q 10/00* (2013.01); *G06F 17/30867* (2013.01)

(58) Field of Classification Search
CPC ... G06Q 10/00; G06F 17/30867; G06F 17/20; G06F 17/30528; G06F 17/3069; Y10S 707/957; Y10S 707/99935

(Continued)

(56) References Cited

U.S. PATENT DOCUMENTS

2006/0020591 A1* 1/2006 Kommers ........... G06F 17/3097
2011/0213655 A1* 9/2011 Henkin ................. G06Q 30/00
705/14.49

FOREIGN PATENT DOCUMENTS

JP 2005-301399 A 10/2005
JP 2009-169541 A 7/2009
(Continued)

OTHER PUBLICATIONS

Mar. 30, 2016 Office Action issued in Japanese Patent Application No. 2013-215927.
(Continued)

*Primary Examiner* — Evan Aspinwall
(74) *Attorney, Agent, or Firm* — Oliff PLC

(57) ABSTRACT

An information retrieval device includes a degree-of-association information storage unit capable of storing an item(s) of degree-of-association information indicating a degree of association between each of an item(s) of first information and each of an item(s) of second information; an accepting unit that accepts a query including an item(s) of query information which is/are an item(s) of information used for retrieval of content; a query converter that obtains, by using an item(s) of first information corresponding to each of the item(s) of query information, and the item(s) of degree-of-association information, an item(s) of second information whose degree of association with the item(s) of first information is greater as a predetermined condition is better satisfied; and a retrieval unit that retrieves content by using the item(s) of second information obtained by the query converter. Accordingly, content necessary for a user can be retrieved.

7 Claims, 15 Drawing Sheets

(58) Field of Classification Search
USPC .......................................................... 707/748
See application file for complete search history.

(56) References Cited

FOREIGN PATENT DOCUMENTS

| JP | 2011-090546 A | 5/2011 |
|----|---------------|--------|
| JP | A-2012-138100 | 7/2012 |
| JP | 2013-025818 A | 2/2013 |
| WO | 2008/053516 A1 | 5/2008 |

OTHER PUBLICATIONS

Sep. 1, 2015 Japanese Office Action issued in Japanese Patent Application No. 2013-215927.

\* cited by examiner

FIG. 7

| (QUERY FEATURE SPACE) | MAKE-UP | DIET | RENT | INSURANCE | HANEDA | GINZA | UMEDA | PRESBYOPIA |
|---|---|---|---|---|---|---|---|---|
| MALE | | | | | | | | |
| FEMALE | 0.5 | 0.5 | | | | | | |
| TWENTIES | 0.2 | 0.2 | | | | | | |
| SIXTIES | 0.2 | | | 0.6 | | | | 0.2 |
| TOKYO | | | 0.2 | | 0.5 | 0.5 | | |
| OSAKA | | | | 0.5 | | | 0.5 | |
| CAR | | | | 0.2 | | | | |
| AT-HOME | | | 0.6 | | | | 0.1 | |

(AD INFORMATION SPACE)

FIG. 9

| ID | QUERY FEATURE SPACE | | | | AD INFORMATION SPACE |
|---|---|---|---|---|---|
| | QUERY TERM | USER CONTEXT | | | |
| | | SEX | GENERATION | POSITION | ... |
| 1 | CAR | MALE | TWENTIES | TOKYO | ... | SHINAGAWA, COMPANY A, ... |
| 2 | BOARDING, OSAKA | FEMALE | FROM 10 TO 19 YEARS OLD | OSAKA | ... | UMEDA, COMPANY X, ... |
| 3 | DIET, SHORT TERM | FEMALE | THIRTIES | TOKYO | ... | DIET, ... |
| 4 | TRAVEL, RECOMMENDED | FEMALE | SIXTIES | FUKUOKA | ... | MAKE-UP, GINZA, ... |
| 5 | HOUSING, EARTHQUAKE | MALE | FORTIES | OSAKA | ... | COMPANY Y, REINFORCED, ... |
| ... | ... | ... | ... | ... | ... | ... |

FIG. 10

| FEATURE TYPE | ORIGINAL DATA | DETAILS |
|---|---|---|
| QUERY FEATURE $q$ | WEB PAGE | WORD(S) EXTRACTED FROM WEB PAGE |
| | USER | WORD(S) EXTRACTED BY USER OPERATION, CATEGORY, BASED ON USER OPERATION, SEX, GENERATION, POSITION |
| AD FEATURE $a$ | AD | WORD WITH GREAT tf-idf VALUE |
| BIAS FEATURE $X_{bias}$ | AD | WORD WITH GREAT tf-idf VALUE |
| | PAST CLICK LOG | PAST CLICK THROUGH RATIO OF AD AND OF OWNER OF AD, POSITION ON WEB PAGE |
| | QUERY AND AD | DEGREE OF SIMILARITY SUCH AS WORD VECTOR COSINE VALUE |

FIG. 11

| WEB SITE | TYPE | $|R^+|$ | $N^{(r)}$ | #clicks |
|---|---|---|---|---|
| A | LEARNING<br>INVESTIGATION<br>TESTING | 752,897<br>207,893<br>177,646 | 11.45<br>10.91<br>10.95 | 1.03<br>1.03<br>1.03 |
| B | LEARNING<br>INVESTIGATION<br>TESTING | 1,597,437<br>403,468<br>311,870 | 10.43<br>8.75<br>4.99 | 1.02<br>1.02<br>1.02 |
| C | LEARNING<br>INVESTIGATION<br>TESTING | 791,919<br>131,235<br>160,217 | 5.51<br>4.86<br>4.89 | 1.02<br>1.01<br>1.01 |
| D | LEARNING<br>INVESTIGATION<br>TESTING | 476,816<br>123,123<br>110,521 | 5.12<br>4.43<br>4.39 | 1.01<br>1.01<br>1.01 |
| E | LEARNING<br>INVESTIGATION<br>TESTING | 655,675<br>159,307<br>134,516 | 12.60<br>11.94<br>11.94 | 1.01<br>1.02<br>1.02 |
| F | LEARNING<br>INVESTIGATION<br>TESTING | 115,964<br>31,384<br>28,663 | 5.00<br>5.00<br>5.00 | 1.04<br>1.04<br>1.04 |
| G | LEARNING<br>INVESTIGATION<br>TESTING | 164,960<br>35,293<br>26,651 | 7.90<br>7.74<br>7.78 | 1.01<br>1.01<br>1.01 |
| H | LEARNING<br>INVESTIGATION<br>TESTING | 390,890<br>99,553<br>80,079 | 4.46<br>3.76<br>3.77 | 1.01<br>1.01<br>1.01 |

FIG. 12

| $M_{filter}$ | WEB SITE | | | | | | | |
|---|---|---|---|---|---|---|---|---|
| | A | B | C | D | E | F | G | H |
| 20 | +0.66% | +1.20% | +0.18% | +0.18% | +0.62% | +1.39% | +0.00% | +0.04% |
| 40 | +0.74% | +1.34% | +0.18% | +0.18% | +0.60% | +1.66% | −0.03% | +0.04% |
| 60 | +0.91% | +1.38% | +0.16% | +0.16% | +0.63% | +1.89% | −0.03% | +0.03% |
| 80 | +0.94% | +1.39% | +0.20% | +0.14% | +0.60% | +1.80% | +0.01% | +0.04% |
| 100 | +1.02% | +1.43% | +0.21% | +0.14% | +0.55% | +1.90% | −0.01% | +0.03% |

# INFORMATION RETRIEVAL DEVICE, INFORMATION RETRIEVAL METHOD, AND NON-TRANSITORY COMPUTER-READABLE RECORDING MEDIUM

CROSS-REFERENCE TO RELATED APPLICATIONS

The present invention contains subject matter related to Japanese Patent Application No. 2013-215927 filed in the Japan Patent Office on Oct. 17, 2013, the entire contents of which are incorporated herein by reference.

BACKGROUND OF THE INVENTION

1. Field of the Invention

The present invention relates to an information retrieval device and the like which retrieve content.

2. Description of the Related Art

There has been technology that determines an ad by using user interest information and map-based location information (for example, see Japanese Unexamined Patent Application Publication No. 2012-138100 (page 1, FIG. 1, etc.).

However, with the related art, it has been difficult to retrieve content such as an ad necessary for a user.

SUMMARY OF THE INVENTION

According to an aspect of the present invention, there is provided an information retrieval device including a degree-of-association information storage unit capable of storing one or more items of degree-of-association information indicating a degree of association between each of one or more items of first information and each of one or more items of second information; an accepting unit configured to accept a query including one or more items of query information, the one or more items of query information being one or more items of information used for retrieval of content; a query converter configured to obtain, by using one or more items of first information corresponding to each of the one or more items of query information, and the one or more items of degree-of-association information, one or more items of second information whose degree of association with the one or more items of first information is greater as a predetermined condition is better satisfied; and a retrieval unit configured to retrieve content by using the one or more items of second information obtained by the query converter.

BRIEF DESCRIPTION OF THE DRAWINGS

FIG. 7 is a diagram illustrating a transformation matrix;

FIG. 9 is a diagram illustrating click logs;

FIG. 10 is a diagram illustrating feature amounts used in an experiment;

FIG. 11 is a diagram illustrating information of web sites used in the experiment;

FIG. 12 is a diagram illustrating the result of the experiment;

DETAILED DESCRIPTION OF THE PREFERRED EMBODIMENTS

Figure 1:
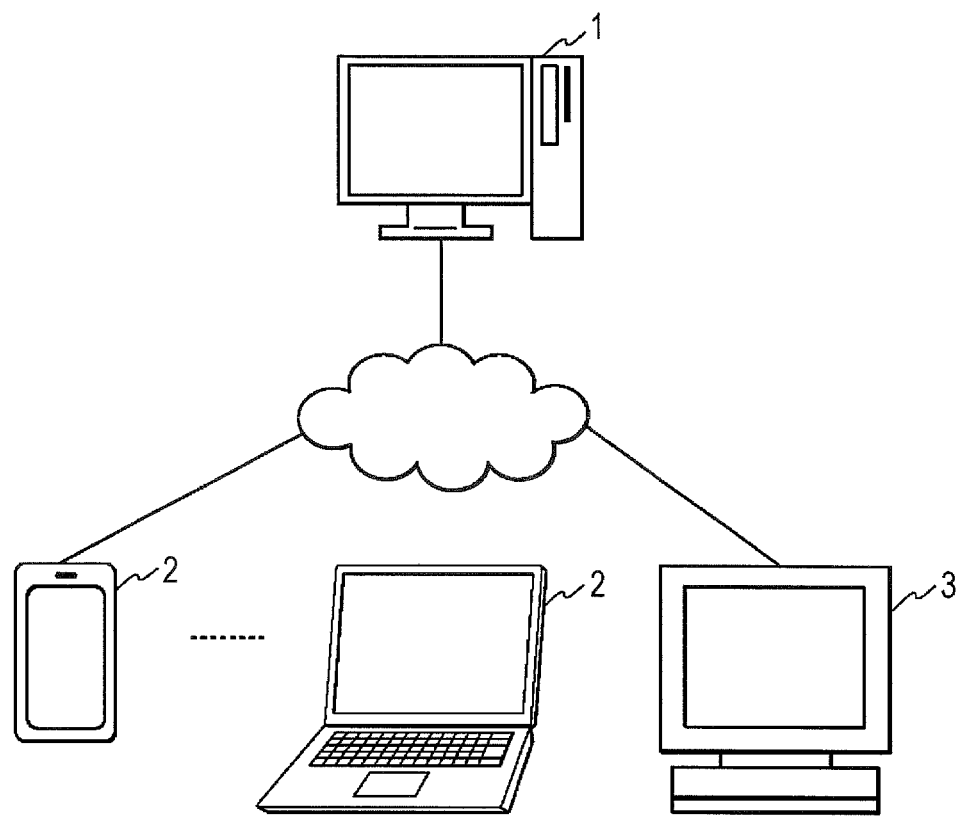
FIG. 1 is a conceptual diagram of an information system according to an embodiment.

Hereinafter, an information retrieval device and the like according to an embodiment will be described with reference to the drawings. Elements with the same reference numerals in the embodiment perform the same or similar operation, and overlapping descriptions thereof may be appropriately omitted.

In the embodiment, an information system including an information retrieval device that performs query expansion using a transformation matrix for a query and retrieves content will be described.

Also in the embodiment, an information system including an information retrieval device corresponding to a query including user context such as a user's sex, age bracket, position, and so forth will be described.

Also in the embodiment, a transformation matrix learning method will be described.

FIG. 1 is a conceptual diagram of the information system according to the embodiment. The information system includes an information retrieval device 1, one or more terminal devices 2, and a content storage device 3. The terminal devices 2 are terminals used by users, such as so-called smartphones, personal computers including notebook computers, and tablet terminals.

Figure 2:
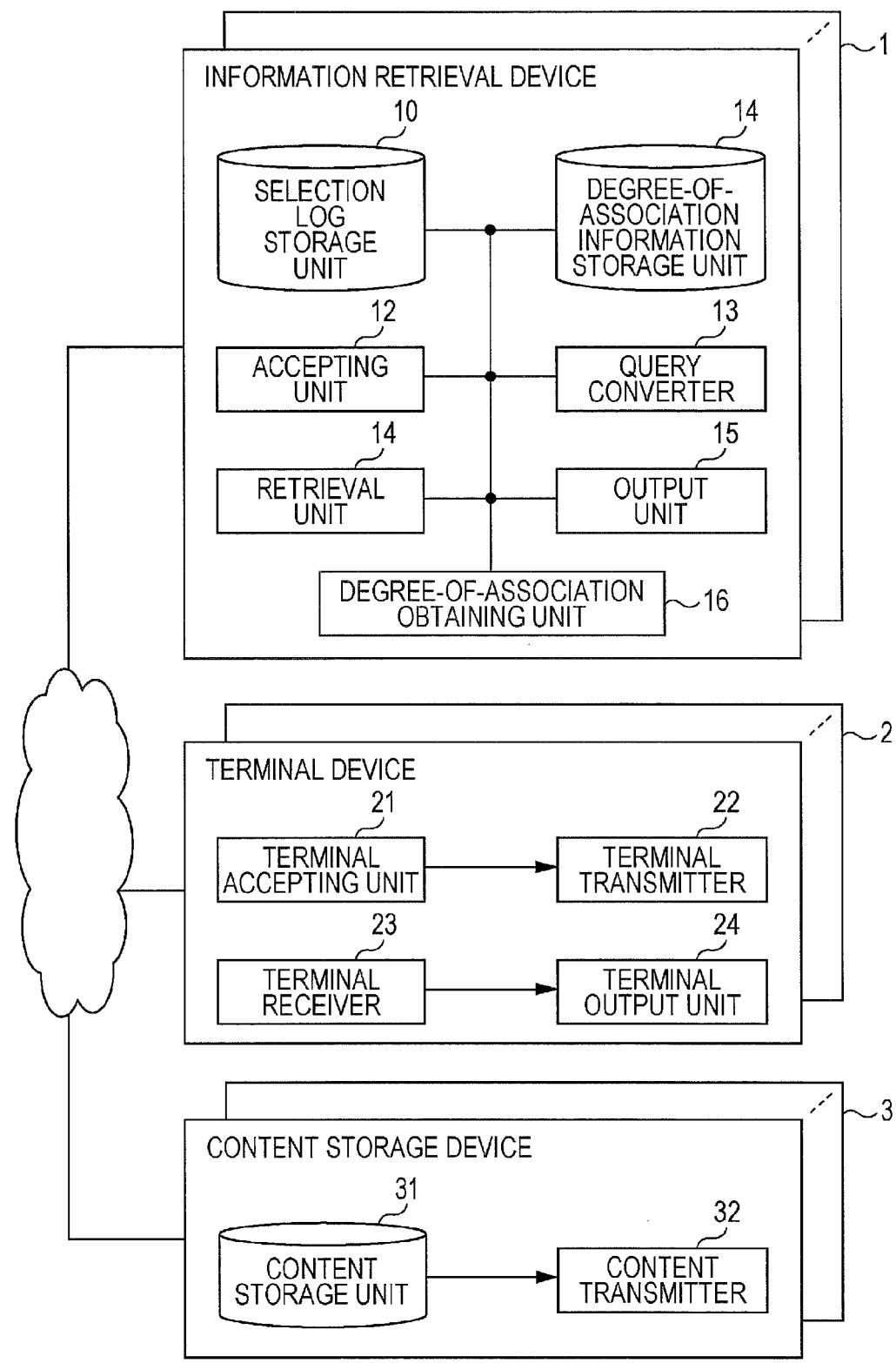
FIG. 2 is a block diagram of the information system.

FIG. 2 is a block diagram of the information system according to the embodiment.

The information retrieval device 1 included in the information system includes a selection log storage unit 10, a degree-of-association information storage unit 11, an accepting unit 12, a query converter 13, a retrieval unit 14, an output unit 15, and a degree-of-association obtaining unit 16.

The terminal device 2 includes a terminal accepting unit 21, a terminal transmitter 22, a terminal receiver 23, and a terminal output unit 24.

The content storage device 3 includes a content storage unit 31 and a content transmitter 32.

The selection log storage unit 10 included in the information retrieval device 1 stores one or more selection logs. A selection log is, for example, a content click log or a content output log. In addition, content is, for example, an ad or a web page. In short, a selection log is, for example, an ad click log or a web page output log. A selection log may be referred to as a click log. Note that a selection log generally includes information of a query for selection and information of selected content. In addition, a selection log includes one or more items of first information that is/are one or more items of query information, and one or more items of second information associated with selected content. Although the selection log storage unit 10 is included in the information retrieval device 1, an external device may include the selection log storage unit 10.

Although first information and second information are generally terms, they may alternatively be images, sounds, or the like. Although terms are generally words, terms may be a collocation or may be part or the entirety of a sentence.

The degree-of-association information storage unit 11 is capable of storing one or more items of degree-of-association information. Degree-of-association information is information indicating the degree of association between first information and second information. In addition, the degree of association is the degree of association, the extent of association, or the like between two items of information. Degree-of-association information includes quantitative information, and the quantitative information is generally a numeral; however, the quantitative information may not be a numeral. In addition, the degree-of-association information storage unit 11 generally stores one or more sets of first information, second information, and degree-of-association information. Alternatively, the degree-of-association information storage unit 11 may store one or more sets of the identifier of first information, the identifier of second information, and degree-of-association information.

The degree-of-association information storage unit 11 may store a transformation matrix. A transformation matrix is a degree-of-association matrix having degree-of-association information. In addition, a transformation matrix is a matrix having, as an element, degree-of-association information indicating the degree of association between each of one or more items of first information and each of one or more items of second information. In addition, a transformation matrix is a matrix in which, for example, one of two axes corresponds to first information, and the other axis corresponds to second information.

The accepting unit 12 accepts an instruction, information, or the like. An instruction, information, or the like accepted by the accepting unit 12 is, for example, a query for retrieving content. A query includes one or more items of query information that is/are one or more items of information used for retrieval of content. Although information here is generally a term, information here may be an image, a sound, or the like. Although a term is generally a word, a term may be a collocation or may be part or the entirety of a sentence. In addition, query information is, for example, information (such as a keyword) input by a user or user context. User context is information regarding a user, such as a user's sex, age, age bracket, position information indicating a position where the user is, weather, season, or time at which the accepting unit 12 has accepted a query or the like, the type of the terminal device 2 used by the user, and so forth. The type of the terminal device 2 is, for example, a smartphone, a mobile phone, a personal computer, or a tablet terminal.

Here, the term "accept" may refer to receiving partially and obtaining partially, or may refer to receiving entirely. For example, in the case where a query includes information input by a user and user context, the accepting unit 12 may receive a keyword input by the user, and may obtain user context from the received information. Information for obtaining user context is, for example, a terminal identifier for identifying the terminal device 2 used by the user. In addition, the terminal identifier is, for example, an Internet Protocol (IP) address or a media access control (MAC) address. In such a case, a storage unit that is not illustrated in the drawings stores user context, such as a user's sex, age bracket, or position, in association with each of one or more terminal identifiers, and the accepting unit 12 obtains, from the storage unit, user context by using a terminal identifier. The accepting unit 12 constitutes a query to use from one or more items of first information that is/are input by a user and received, and the obtained user context. In addition, the accepting unit 12 may obtain the current time, season, or weather (the weather at a position where the user is) from a server device that is not illustrated in the drawings. The current time, season, or weather mentioned here is also user context.

In addition, the accepting unit 12 may accept a uniform resource locator (URL) and may obtain one or more terms from a web page identified by the URL. The term(s) mentioned here is/are first information.

In addition, the term "accept" may refer to acceptance of information input from an input device, such as a keyboard, a mouse, or a touch panel, reception of information transmitted via a wired or wireless communication line, and acceptance of information read from a recording medium such as an optical disk, a magnetic disk, or a semiconductor memory, and the term "accept" may be interpreted in a broad sense.

In addition, content may be associated with one or more items of to-be-retrieved information that is/are a set(s) of second information and weight information. Weight information is information indicating the weight of second information for content. In addition, although content is preferably an ad, content may alternatively be other types of information such as a web page or program information. Note that program information may be information for constituting an electronic program guide (EPG) or information of the program itself.

The query converter 13 obtains one or more items of second information to be used in retrieval, by using a query accepted by the accepting unit 12.

Specifically, by using one or more items of first information corresponding to each of one or more items of query information and one or more items of degree-of-association information, the query converter 13 obtains one or more items of second information whose degree of association with one or more items of first information is greater as a predetermined condition is better satisfied. First information corresponding to query information is generally first information that is the same as query information. In addition, a predetermined condition is, for example, second information whose degree(s) of association is/are top N (N is a natural number greater than or equal to 1), or second information whose degree of association is greater than X. It is preferable that the query converter 13 additionally obtain a value associated with each item of second information to be obtained.

The query converter 13 obtains a value corresponding to each of one or more items of second information by multiplying, for example, a query vector, which is a vector using one or more items of query information accepted by the accepting unit 12, and a transformation matrix, and obtains one or more items of second information corresponding to a value that is greater as the value better satisfies a predetermined condition. A query vector is generally a vector whose element corresponding to query information is 1 and element not corresponding to query information is 0. Here, a predetermined condition is, for example, second information whose degree(s) of association is/are top N (N is a natural number greater than or equal to 1), or second information whose degree of association is greater than X.

Using one or more items of second information obtained by the query converter 13, the retrieval unit 14 retrieves content. The retrieval unit 14 retrieves content by generally using one or more items of second information as a retrieval key. Here, content is, for example, an ad or a web page. In addition, although the retrieval unit 14 retrieves one or more items of content from the content storage device 3 here, the retrieval unit 14 may alternatively obtain one or more items of content from a content database held by the information retrieval device 1. Generally, one or more items of second information is/are associated with content.

In addition, it is preferable that the retrieval unit 14 retrieve one or more items of content using one or more sets of second information and a value obtained by the query converter 13. For example, the retrieval unit 14 obtains, for each item of content, the sum of a value(s) of one or more items of second information corresponding to one or more items of second information associated with each item of content in the content database, and obtains one or more items of content that is/are greater as the sum of the value(s) better satisfies a predetermined condition.

The output unit 15 outputs one or more items of content obtained by the retrieval unit 14. Here, the term "output" generally refers to transmission to the terminal device 2. Note that the term "output" may be regarded as including displaying on a display, projection using a projector, printing with a printer, a sound output, accumulation on a recording medium, and transfer of the processing result to another processing device or another program.

The degree-of-association obtaining unit 16 obtains, from one or more selection logs, degree-of-association information between each of one or more items of first information and each of one or more items of second information. Generally, as the number of selection logs in which first information and second information are associated with each other becomes greater, the degree-of-association obtaining unit 16 obtains degree-of-association information whose value is greater with respect to the first information and the second information.

In addition, the degree-of-association obtaining unit 16 obtains, from one or more selection logs, a transformation matrix having, as an element, degree-of-association information indicating the degree of association between each of one or more items of first information and each of one or more items of second information.

Further, it is preferable that, for each of one or more items of first information, the degree-of-association obtaining unit 16 obtain, from one or more selection logs, a first selectivity that is the selectivity of content corresponding to each of one or more items of second information, and a second selectivity that is the selectivity of content corresponding to each of one or more items of first information and each of one or more items of second information. It is also preferable that, for each of one or more items of second information, the degree-of-association obtaining unit 16 calculate the ratio between the first selectivity and the second selectivity, and only obtain degree-of-association information between first information and second information, which is greater as the ratio better satisfies a predetermined condition.

The terminal accepting unit 21 included in the terminal device 2 accepts an instruction, information, or the like from a user. An instruction, information, or the like is, for example, a query including one or more items of information. Note that one or more items of information is/are, for example, one or more terms.

An input unit for inputting an instruction, information, or the like can be any unit, such as a keyboard, a mouse, a touch panel, or one using a menu screen. The terminal accepting unit 21 is realizable with a device driver of an input unit, such as a keyboard, or control software of a menu screen.

The terminal transmitter 22 transmits an instruction, information, or the like accepted by the terminal accepting unit 21 to the information retrieval device 1.

In response to transmission of an instruction, information, or the like from the terminal transmitter 22, the terminal receiver 23 accepts information from the information retrieval device 1. Note that the information received by the terminal receiver 23 includes, for example, one or more items of content as a result of retrieval.

The terminal output unit 24 outputs information received by the terminal receiver 23. Here, the term "output" may be regarded as including or not including an output device such as a display or a loudspeaker. The terminal output unit 24 is realizable with driver software of an output device, or driver software of an output device and the output device.

The content storage unit 31 included in the content storage device 3 is capable of storing one or more items of content. Content is generally associated with one or more items of second information.

In response to a request from the information retrieval device 1, the content transmitter 32 obtains one or more items of content from the content storage unit 31, and transmits the obtained item(s) of content to the information retrieval device 1.

The selection log storage unit 10, the degree-of-association information storage unit 11, and the content storage unit 31 are preferably non-volatile recording media, but these units 10, 11, and 31 are also realizable with volatile recording media. Note that the process of storing selection logs or the like in the selection log storage unit 10 or the like does not matter. For example, selection logs or the like may be stored in the selection log storage unit 10 or the like via a recording medium, or selection logs or the like transmitted via a communication line or the like may be stored in the selection log storage unit 10 or the like. Alternatively, selection logs or the like input via an input device may be stored in the selection log storage unit 10 or the like.

The query converter 13, the retrieval unit 14, and the degree-of-association obtaining unit 16 are generally realizable from a microprocessing unit (MPU), a memory, and so forth. A procedure of the degree-of-association obtaining unit 16 is generally realized with software, and the software is recorded on a recording medium such as a read-only memory (ROM). Alternatively, the procedure may be realized with hardware (dedicated circuit).

Although the output unit 15 is generally realized with a wireless or wired communication unit, the output unit 15 may alternatively be realized with a broadcasting unit.

Although the terminal transmitter 22 and the content transmitter 32 are generally realized with wireless or wired communication units, the terminal transmitter 22 and the content transmitter 32 may alternatively be realized with broadcasting units.

Although the terminal receiver 23 is generally realized with a wireless or wired communication unit, the terminal receiver 23 may alternatively be realized with a unit that receives a broadcast.

Next, the operation of the information system will be described. First, the operation of the information retrieval device 1 for retrieving content will be described using the flowchart illustrated in FIG. 3.

(step S301) The accepting unit 12 determines whether a query or the like has been received from the terminal device 2. If a query or the like has been received, the process proceeds to step S302; if a query or the like has not been received, the process returns to step S301. Note that the term "query or the like" here refers to information for obtaining one or more items of query information input by a user, and user context, and is a terminal identifier for identifying the terminal device 2. A terminal identifier is, for example, the IP address of the terminal device 2. In addition, query information is, for example, a keyword.

(step S302) The accepting unit 12 obtains user context using the terminal identifier received in step S301.

(step S303) The accepting unit 12 constitutes a query to use from one or more items of first information included in the query received in step S301 and/or one or more items of first information that may be obtained from the query, and the user context obtained in step S302.

(step S304) The query converter 13 obtains one or more items of degree-of-association information stored in the degree-of-association information storage unit 11.

(step S305) The query converter 13 calculates the value of the degree of association corresponding to each of one or more items of second information, by using one or more items of first information included in the query constituted in step S303, and the item or items of degree-of-association information obtained in step S304. A process of calculating the value of the degree of association will be described using the flowchart illustrated in FIG. 4.

(step S306) The query converter 13 obtains one or more items of second information corresponding to a value that is greater as the value of the degree of association calculated in step S305 better satisfies a predetermined condition. Here, the query converter 13 may obtain one or more sets of second information and degree-of-association information.

(step S307) The retrieval unit 14 retrieves content using the item or items of second information obtained in step S306. The retrieval unit 14 may retrieve content using the set or sets of second information and degree-of-association information obtained in step S306. Here, it is assumed that the retrieval unit 14 obtains one or more items of content from the content storage device 3.

(step S308) The output unit 15 transmits the item or items of content obtained in step S307 to the terminal device 2. The process returns to step S301.

Figure 3:
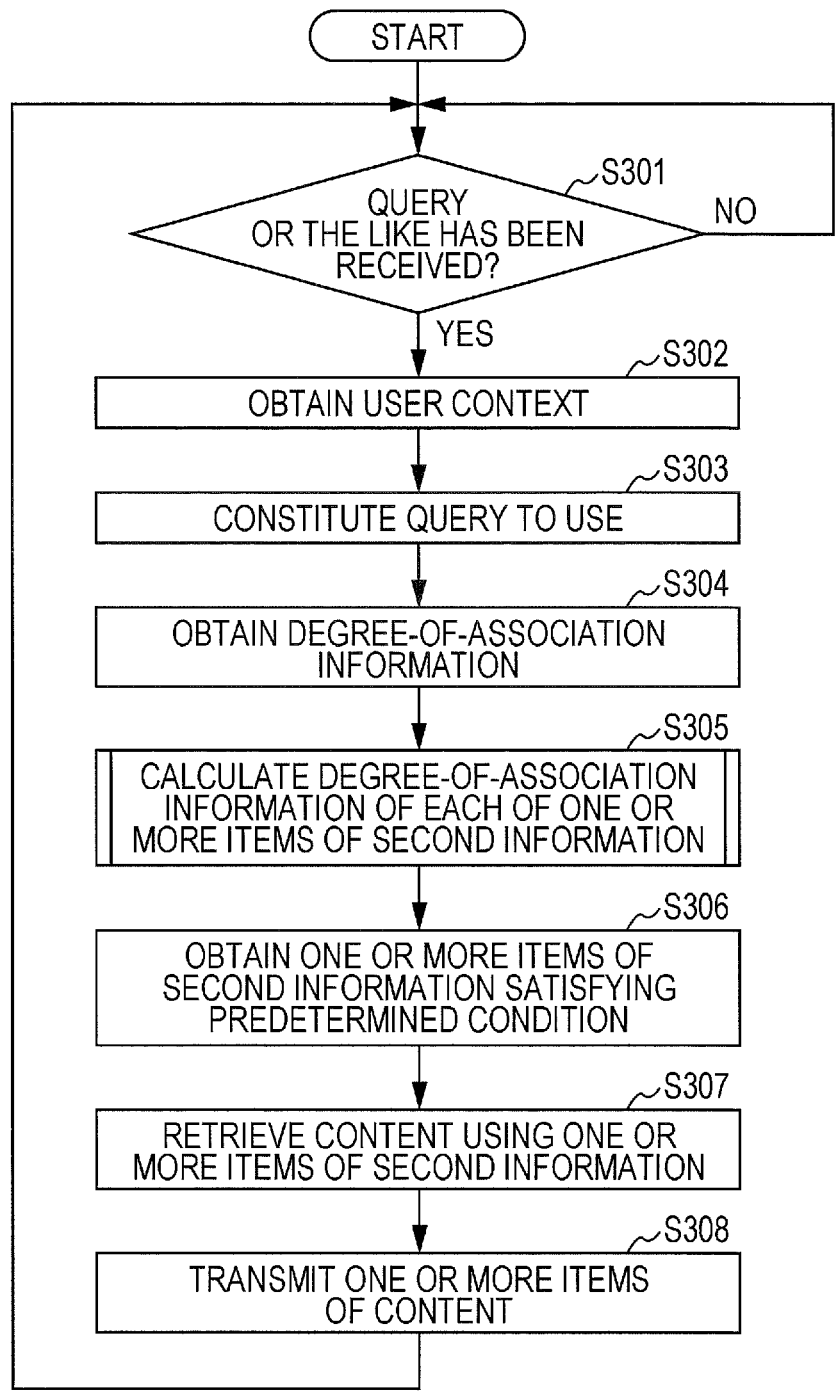
FIG. 3 is a flowchart describing the operation of an information retrieval device for retrieving content.

Note that, in the flowchart illustrated in FIG. 3, the process ends when the power is turned off or in response to a process end interruption.

Figure 4:
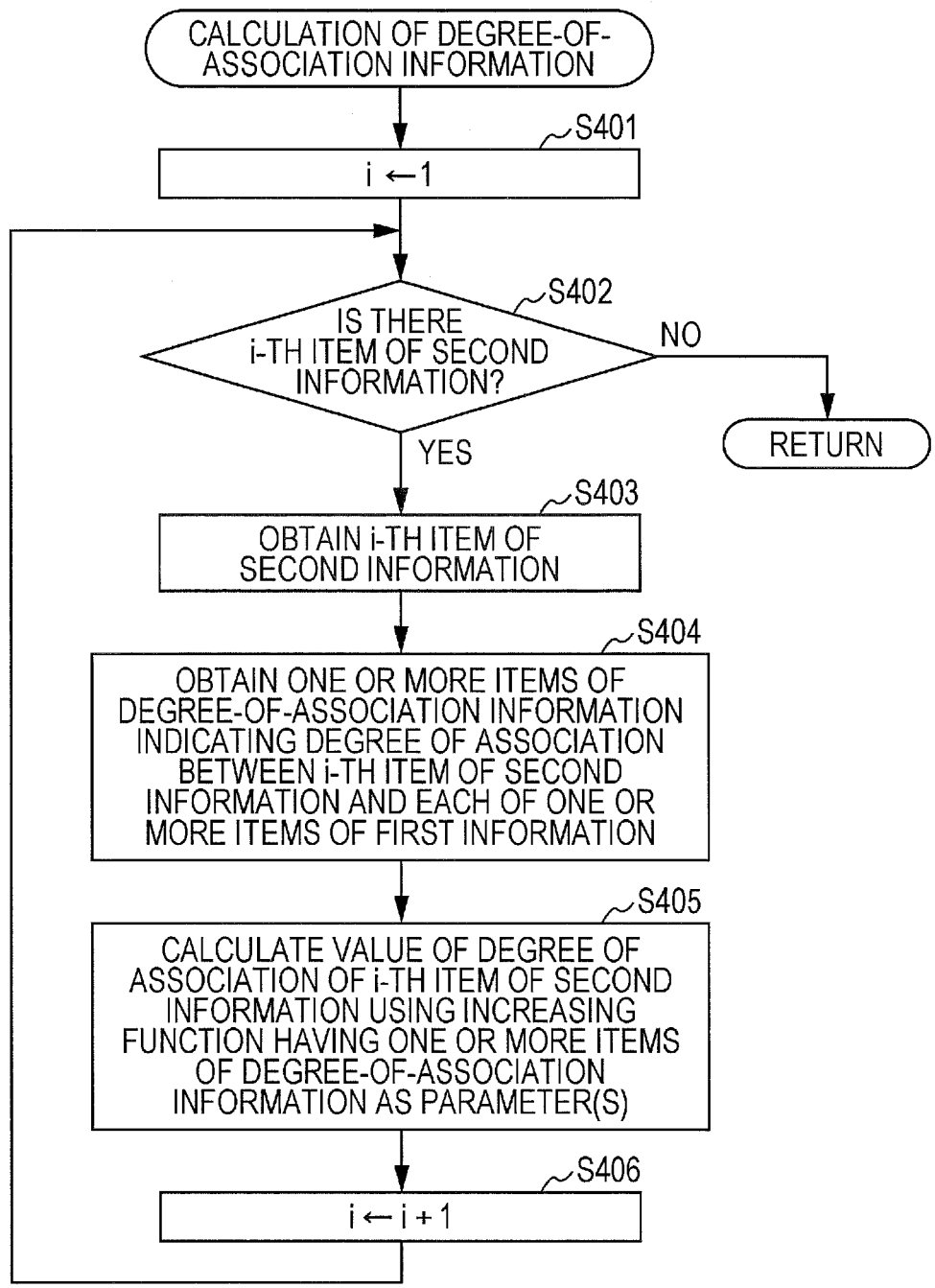
FIG. 4 is a flowchart describing a degree-of-association value calculating process.

Next, the process of calculating the value of the degree of association in step S305 will be described using the flowchart illustrated in FIG. 4.

(step S401) The query converter 13 substitutes 1 for a counter i.

(step S402) The query converter 13 determines whether there is an i-the item of second information. If there is an i-th item of second information, the process proceeds to step S403; if there is no i-th item of second information, the process returns to a host process. Note that the query converter 13 determines, for example, whether there is second information corresponding to an i-th item of degree-of-association information stored in the degree-of-association information storage unit 11.

(step S403) The query converter 13 obtains the i-th item of second information. Note that the query converter 13 may obtain, for example, the i-th item of second information from the degree-of-association information storage unit 11, or, for example, may obtain, from an external device that is not illustrated in the drawings, the i-th item of second information corresponding to the i-th item of degree-of-association information stored in the degree-of-association information storage unit 11.

(step S404) The query converter 13 obtains, from the degree-of-association information storage unit 11, one or more items of degree-of-association information indicating the degree of association between the i-th item of second information obtained in step S403 and each of one or more items of first information.

(step S405) The query converter 13 calculates the degree of association information of the i-th item of second information by using an increasing function that has the item or items of degree-of-association information obtained in step S404 as a parameter(s). Note that the increasing function may be a formula for calculating the sum of one or more items of degree-of-association information, a formula for calculating the sum of values obtained by multiplying one or more items of degree-of-association by a weight, a formula for calculating the average of one or more items of degree-of-association information, or a formula for calculating a weighted average of one or more items of degree-of-association information. A weight in a weighted average is, for example, a weight applied to each of one or more items of first information.

(step S406) The query converter 13 increments the counter i by 1. The process returns to step S402.

Figure 5:
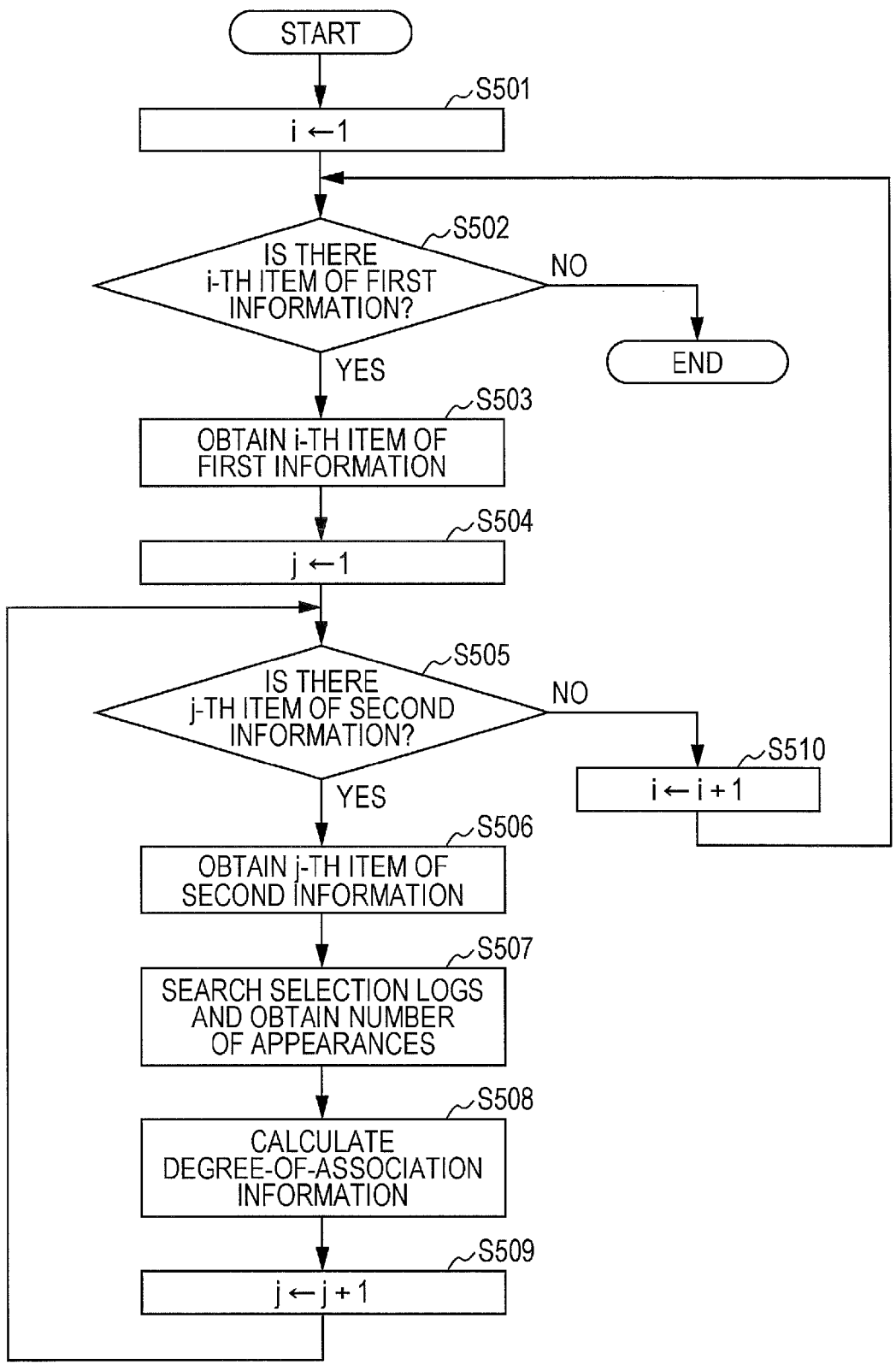
FIG. 5 is a flowchart describing the operation of the information retrieval device for obtaining degree-of-association information.

Next, the operation of the information retrieval device 1 for obtaining degree-of-association information will be described using the flowchart illustrated in FIG. 5.

(step S501) The degree-of-association obtaining unit 16 substitutes 1 for a counter i.

(step S502) The degree-of-association obtaining unit 16 determines whether there is an i-th item of first information. If there is an i-th item of first information, the process proceeds to step S503; if there is no i-th item of first information, the process ends.

(step S503) The degree-of-association obtaining unit 16 obtains the i-th item of first information. Note that the degree-of-association obtaining unit 16 obtains the i-th item of first information from, for example, the selection log storage unit 10.

(step S504) The degree-of-association obtaining unit 16 substitutes 1 for a counter j.

(step S505) The degree-of-association obtaining unit 16 determines whether there is a j-th item of second information. If there is a j-th item of second information, the process proceeds to step S506; if there is no j-th item of second information, the process proceeds to step S510.

(step S506) The degree-of-association obtaining unit 16 obtains the j-th item of second information. Note that the degree-of-association obtaining unit 16 obtains the j-th item of second information from, for example, the selection log storage unit 10.

(step S507) The degree-of-association obtaining unit 16 searches the selection log storage unit 10 using the i-th item of first information and the j-th item of second information, and obtains the number of selection logs in which both the i-th item of first information and the j-th item of second information appear (the number of appearances).

(step S508) Using the number of appearances obtained in step S507, the degree-of-association obtaining unit 16 calculates degree-of-association information indicating the degree of association between the i-th item of first information and the j-th item of second information. By using an increasing function that has the frequency of appearance as a parameter, the degree-of-association obtaining unit 16 calculates degree-of-association information indicating the degree of association between the i-th item of first information and the j-th item of second information. Here, the increasing function f is, for example, "f (number of appearances)=number of appearances/number of all selection logs". Note that the number of all selection logs is the number of selection logs stored in the selection log storage unit 10. In addition, the increasing function f may be, for example, "f (number of appearances)=number of appearances".

(step S509) The degree-of-association obtaining unit 16 increments the counter j by 1. The process returns to step S505.

(step S510) The degree-of-association obtaining unit 16 increments the counter i by 1. The process returns to step S502.

Next, the operation of the terminal device 2 will be described. The terminal accepting unit 21 accepts an instruction, information, or the like, such as a query, from a user. The terminal transmitter 22 transmits the instruction, information, or the like accepted by the terminal accepting unit 21 to the information retrieval device 1. Next, in response to transmission of the instruction, information, or the like by the terminal transmitter 22, the terminal receiver 23 receives information from the information retrieval device 1. The terminal output unit 24 outputs the information received by the terminal receiver 23. Since the terminal device 2 is realizable with a device based on the related art, a detailed description thereof is omitted.

Next, the operation of the content storage device 3 will be described. In response to a request from the information retrieval device 1, the content transmitter 32 obtains one or more items of content from the content storage unit 31. Next, the content transmitter 32 transmits the item or items of obtained content to the information retrieval device 1. Since the content storage device 3 is realizable with a device based on the related art, a detailed description thereof is omitted.

Hereinafter, a specific operation of the information retrieval device 1 according to the embodiment will be described. In this specific example, it is assumed that content is an ad, and the ad is an ad that is inserted in a web page and displayed.

Figure 6:
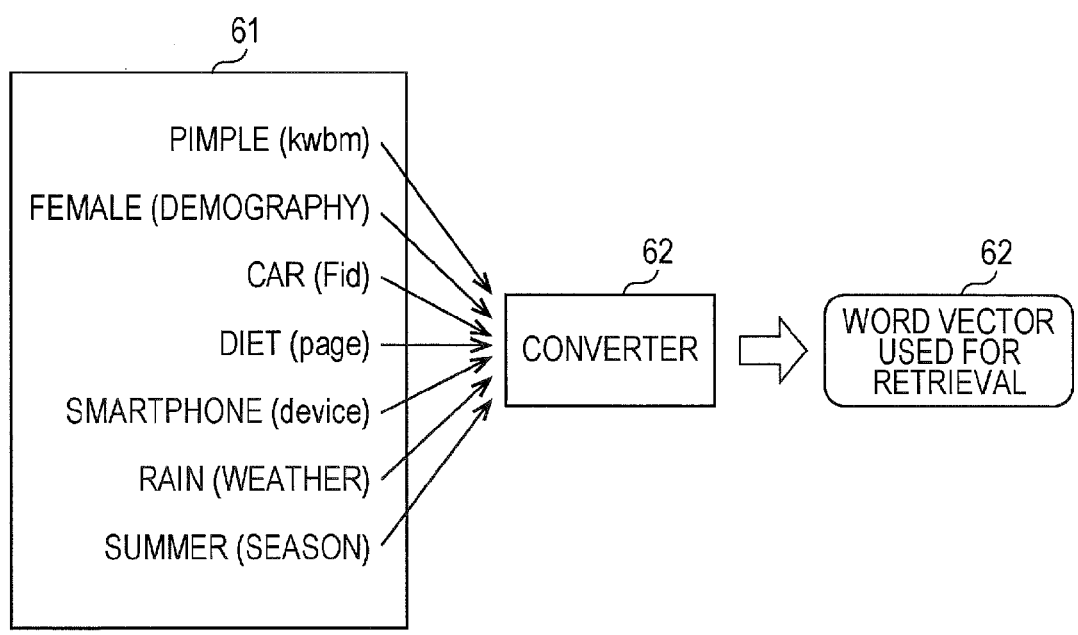
FIG. 6 is a diagram illustrating the concept of the operation of the information retrieval device.

For example, as illustrated in FIG. 6, the information retrieval device 1 converts a query 61 accepted by the accepting unit 12 by using a converter 62, thereby obtaining a word vector 63. Note that the query 61 includes seven items of query information. In the query 61, "pimple (kwbm)" indicates that the term "pimple" is a keyword input by a user from the terminal device 2. In addition, "female (demography)" indicates that, of the user's user context, the sex is "female". In addition, "car (Fid)" indicates an interest category estimated from the user's activity log. In addition, "diet (page)" indicates that a characteristic word that well represents the contents of a web page is "diet". In addition, "smartphone (device)" indicates that the type of the terminal device 2 used by the user is a "smartphone". In addition, "rain (weather)" indicates that the weather at a position where the user is is "rain". Further, "summer (season)" indicates that the current season is "summer".

In addition, the converter 62 corresponds to the above-mentioned degree-of-association information storage unit 11 and query converter 13. Further, the word vector 63 is an example of a vector corresponding to one or more items of second information obtained by the query converter 13.

It is assumed that the degree-of-association information storage unit 11 of the information retrieval device 1 is currently holding a transformation matrix illustrated in FIG. 7. The vertical axis of the transformation matrix illustrated in FIG. 7 is a query feature space and is an example of a first information set that has eight items of first information. In addition, the horizontal axis of the transformation matrix illustrated in FIG. 7 is an ad content information space and is an example of a second information set that has eight items of second information.

In such a circumstance, it is assumed that a user has input the keyword "car" to the terminal device 2. Next, the terminal accepting unit 21 of the terminal device 2 accepts a query including the keyword "car".

Next, the terminal transmitter 22 transmits the query including the keyword "car" and the IP address of the terminal device 2 to the information retrieval device 1.

Next, the accepting unit 12 of the information retrieval device 1 receives the query including the keyword "car" and the IP address of the terminal device 2.

Next, the accepting unit 12 obtains the user context "female", "twenties", and "Osaka" from the user IP address of the terminal device 2. Note that it is assumed that a storage unit of the information retrieval device 1, which is not illustrated in the drawings, holds user context in association with an IP address.

The accepting unit 12 obtains a query vector (0, 1, 1, 0, 0, 1, 1, 0) that has the keyword "car" and the user context "female", "twenties" and "Osaka"). Note that (0, 1, 1, 0, 0, 1, 1, 0) indicates "(male, female, twenties, sixties, Tokyo, Osaka, car, home)=(0, 1, 1, 0, 0, 1, 1, 0)".

Next, the query converter 13 obtains the transformation matrix (see FIG. 7) stored in the degree-of-association information storage unit 11.

Next, the query converter 13 multiples the transformation matrix by the query vector, thereby calculating the value of the degree of association corresponding to each of the eight items of second information. The query converter 13 regards that the value of the degree of association of the second information "make-up" is "0.7", the value of the degree of association of the second information "diet" is "0.7", the value of the degree of association of the second information "rent" is "0", the value of the degree of association of the second information "insurance" is "0.5", the value of the degree of association of the second information "Haneda" is "0", the value of the degree of association of the second information "Ginza" is "0", the value of the degree of association of the second information "Umeda" is "0.5", and the value of the degree of association of the second information "presbyopia" is "0", and respectively obtains these values of the degree of association.

Next, the query converter 13 obtains four items of second information "make-up", "diet", "insurance" and "Umeda" whose calculated values of the degree of association correspond to greater values as a predetermined condition is better satisfied. Note that it is assumed that the predetermined condition is "obtaining items of second information whose values of the degree of association are top 4".

Figure 8:
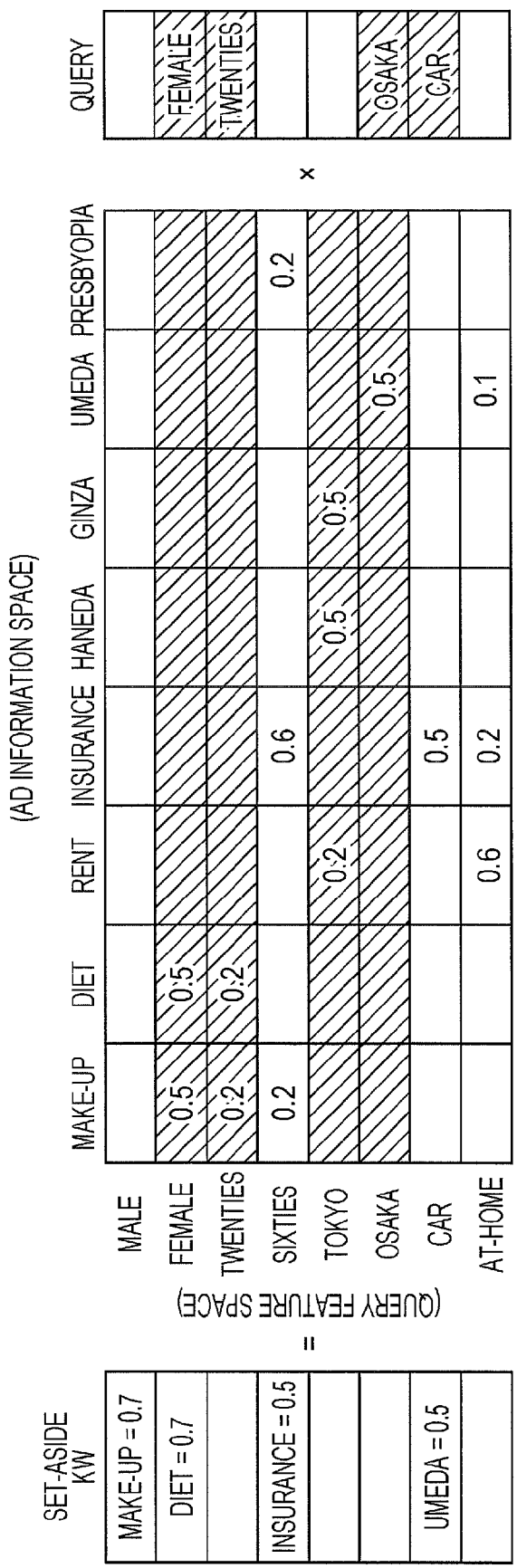
FIG. 8 is a diagram illustrating the concept of a process performed by a query converter.

FIG. 8 illustrates the concept of a process of the query converter 13 as described above. In FIG. 8, second information is represented as set-aside keywords. Set-aside keywords are keywords used when retrieving content such as an ad.

Next, the retrieval unit 14 obtains one or more ads stored in the content storage device 3 by using the four items of second information "make-up", "diet", "insurance", and "Umeda".

Next, the output unit 15 transmits the ad or ads obtained by the retrieval unit 14 to the terminal device 2. Note that a web page is additionally transmitted to the terminal device 2 by a unit that is not illustrated in the drawings. The terminal receiver 23 of the terminal device 2 receives the web page and the ad or ads. Next, the terminal output unit 24 inserts the ad or ads into the received web page, and outputs the web page including the ad or ads.

Next, the specific operation of the degree-of-association obtaining unit 16 of the information retrieval device 1 for obtaining degree-of-association information will be described.

Currently, the selection log storage unit 10 is storing, for example, many click logs illustrated in FIG. 9. A click log has a query feature space and an ad information space. A query feature space has a query term, which is a term used by a user for retrieval, and user context. Here, user context includes sex, generation, position (position of the user), and so forth. In addition, an ad information space has one or more words.

Here, a click log is, for example, information obtained at the time a user clicks an ad displayed on a web page. Since a method of collecting click logs is the related art, a detailed description thereof is omitted. Note that a click log is an example of a selection log. In addition, a query word and user context included in a query feature space are examples of first information. Further, each word in an ad information space is an example of second information.

In addition, it is assumed that an ad here is, for example, a text ad, and an ad is associated with one or more words. Note that one or more words is/are a word(s) that well represents the characteristics of the ad, and, for example, is/are one or more words whose tf-idf value is greater than a threshold in the ad. Since the tf-idf value is the related art, a description thereof is omitted.

In such a circumstance, the degree-of-association obtaining unit 16 obtains, from many click logs in the selection log storage unit 10, degree of association information between each of one or more items of first information and each of one or items of second information. Here, the degree-of-association obtaining unit 16 calculates degree of association information ($w_{ij}$) indicating the degree of association between a query feature ($q_i$) that is information included in a query feature space and an ad word ($a_j$) that is information included in an ad information space. Specifically, the degree-of-association obtaining unit 16 calculates degree of association information ($w_{ij}$) whose value becomes greater as the number of click logs in which the query feature ($q_i$) is associated with the ad word ($a_j$) becomes greater.

Further, specifically, the degree-of-association obtaining unit 16 calculates degree of association information ($w_{i,j}$) by using, for example, a first method or a second method described below.

(First Method)

The degree-of-association obtaining unit 16 obtains, for each combination of a query feature ($q_i$) and an ad word ($a_j$), the probability that the query feature ($q_i$) is associated with the ad word ($a_j$) in all click logs. The degree-of-association obtaining unit 16 obtains a transformation matrix having that probability as an element. Note that the probability that the query feature ($q_i$) is associated with the ad word ($a_j$) is the probability that both the query feature ($q_i$) and the ad word ($a_j$) appear in click logs.

(Second Method)

For each combination of a query feature ($q_i$) and an ad word ($a_j$) the degree-of-association obtaining unit 16 calculates $m_{i,j}$ using the following equation (1):

$$m_{i,j} = \frac{ctr(q_i, a_j)}{ctr(a_j)} \quad (1)$$

where $w_{i,j}$ is degree of association information.

In equation (1), $ctr(q_i, a_j)$ is the probability that both the query feature ($q_i$) and the ad word ($a_j$) appear in click logs. Note that $ctr(q_i, a_j)$ is the above-mentioned second selectivity. In addition, the second selectivity is the selectivity of content corresponding to each of one or more items of first information and each of one or more items of second information.

In addition, $ctr(a_j)$ in equation (1) is the probability that the ad word ($a_j$) appears. Note that ctr is the acronym of the term "click-through rate". Note that $ctr(a_j)$ is the above-mentioned first selectivity. In addition, the first selectivity is the selectivity of content corresponding to each of one or more items of second information.

In addition, $m_{i,j}$ that takes a great value indicates that "an ad including the ad word ($a_j$) is more likely to be clicked in the case where a query includes the query feature ($q_i$)".

The degree-of-association obtaining unit 16 only obtains degree of association ($m_{i,j}$), between the first information and the second information, which is greater as $m_{i,j}$ better satisfies a predetermined condition. Here, the predetermined condition is, for example, adopting only the $M_{filter}$ (number) $m_{i,j}$ for each of one or more query features ($q_i$) (see equation (2)). Note that $M_{filter}$ is a natural number that is greater than or equal to 1. In addition, $A_1$ is an adopted $m_{i,j}$.

$$A_i = \{j | \text{where } m_{ij} \text{ in the top } M_{filter} \text{ for } i\} \quad (2)$$

(Experiment)

Hereinafter, the result of an experiment in the case where the above-described second method is used will be described. In this experiment, ad click logs output to a web page were used. In short, content was an ad.

In this experiment, click logs for six weeks were used. Among these click logs for six weeks, click logs for the first four weeks were used for learning a transformation matrix. Click logs for the next one week were used for investigating the transformation matrix. Click logs for the last one week were used for testing. Here, investigation refers to adjusting a hyper parameter such as C in a support vector machine (SVM) by performing cross-validation.

Here, the structure of each click log is ($q^{(r)}$, $a^{(r)}_i$, $y^{(r)}_i$). Here, "$q^{(r)}$" is a query feature vector of a request r. In addition, $a^{(r)}_i$ is an ad feature vector of an ad output i-th time of the request r. In addition, $y^{(r)}_i$ is an output value, which is a value that may take "1" when the user clicks the ad and "0" when the user does not click the ad.

In addition, "$q^{(r)}$" includes a word extracted from an output web page and user context. A word extracted from a web page is a word with a great tf-idf value, with respect to the title or descriptive words of the web page. In addition, sex, generation, and position were used as user context. The sex may take male, female, or unknown. In addition, the generation is grouped into decades and may take information such as from 10 to 19 years old, twenties, thirties, or the like.

In addition, a bias feature ($x_{bias}$) was additionally used in this experiment. A bias feature is the degree of similarity, such as the feature amount of the ad, the position of the ad on the web page, or a word vector cosine value. The feature amount of the ad is a word with a great tf-idf value or the click-through rate (CTR) of the ad or the owner of the ad in the past. Note that FIG. 10 illustrates feature amounts used in the above-described experiment. FIG. 10 has "feature type", "original data", and "details". In FIG. 10, "original data" is data based on which an element (feature amount) included in a feature vector is obtained, and "details" are the details or the specific example of the feature amount.

In addition, FIG. 11 illustrates information of web sites used in this experiment. In this experiment, eight web sites A to H were used. In addition, in FIG. 11, |R⁺| indicates the number of clicks, $N^{(r)}$ indicates the average number of ads output per click, and #clicks indicates the average number of ads clicked per click request.

Under the above-mentioned conditions, the technique according to the present application (second method) was compared with a baseline model. In the baseline model, only a bias feature was used. The baseline model is a technique that has only a bias term as a feature amount. Note that a bias term is, for example, the original tendency that the ad is clicked, a cosine similarity between simple word vectors, or the like.

In addition, in order to improve the performance of an ad retrieval system, the number of words in a query feature ($M_{retrieve}$) was restricted. In this experiment, the value of $M_{retrieve}$ was changed and evaluated. A scoring function is the following equation (3):

$$\text{score}_{truncated}(q,a) = \text{sim}_{truncated}(q,a) + \text{bias}(q,a) \quad (3)$$

In equation (3), the $\text{sim}_{truncated}$ function is a function obtained by transforming the above-mentioned Sim function and represents a similarly function in the case where the number of conversion words of each query feature is restricted to $M_{retrieve}$. In addition, in the experiment, instead of restricting the number of conversion words of each query feature, $M_{retrieve}$ was changed at the time of evaluation, thereby detecting a change in precision.

In this experiment, the performance of the model was evaluated using "Mean Average precision (MAP)" (see "C. D. Manning, P. Raghavan, and H. Schtze. Introduction to Information Retrieval. Cambridge University Press, 2008").

MAP is indicated by the following equations (4). In equations (4), $AP^{(r)}$ is obtained by increasing k in the request r and taking the average precision among all displayed ads. In addition, $P_k^{(r)}$ represents the precision at the time top k prediction scores of the r-th request are observed. Here, "$\pi^{(r)}(k)$" represents an ad whose prediction score is k-th (impression) in the r-th request.

$$MAP = \frac{1}{|R^+|} \sum_{r \in R^+} AP^{(r)} \quad (4)$$

$$AP^{(r)} = \frac{\sum_{k=1}^{N^{(r)}} P_k^{(r)} y_{\pi^{(r)}(k)}^{(r)}}{\sum_{k=1}^{N^{(r)}} y_{\pi^{(r)}(k)}^{(r)}}$$

$$P_k^{(r)} = \frac{\sum_{l=1}^{k} y_{\pi^{(r)}(l)}^{(r)}}{k}$$

In addition, the score of the method was normalized using the baseline model (see equation (5)):

$$\Delta MAP_{method} = \left( \frac{MAP_{method}}{MAP_{baseline}} - 1 \right) \times 100 \quad (5)$$

First, $M_{filter}$ was changed to evaluate the method according to the present application. With regard to elements in a transformation matrix W, an element that is not 0 changes in accordance with $M_{filter}$. That is, the model performance is expected to be improved when $M_{filter}$ is increased. FIG. 12 illustrates the result of the experiment in which $M_{filter}$ is changed.

It is clear from FIG. 12 that the method according to the present application is improved, compared with the baseline model, except for the web page G. In addition, the degree of improvement is proportional to the number of sample sets at the time of learning, except for the web site F (see FIG. 11).

In addition, in the web sites A, B, and F, the degree of improvement is increased as $M_{filter}$ is increased. In contrast, in the web site D, the degree of improvement is slightly decreased as $M_{filter}$ is increased.

Figure 13:
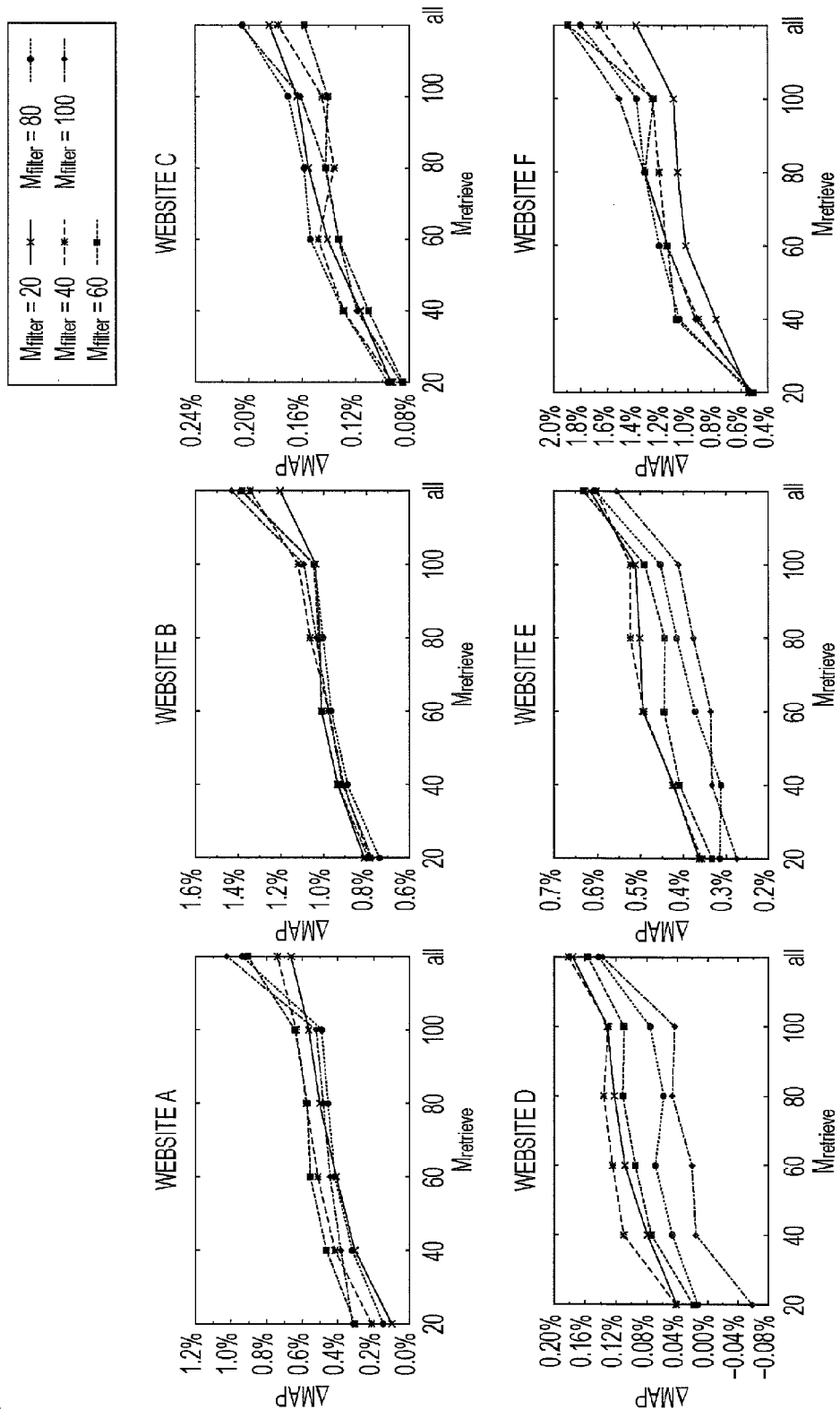
FIG. 13 is a diagram illustrating the result of the experiment.

Next, in the experiment, what the performance was like when the value of $M_{retrieve}$ was changed was investigated for each value of $M_{filter}$. As h as been described above, in the experiment, $M_{retrieve}$ was changed, and, a query term vector was truncated at the time of evaluation and was not truncated at the time of learning. FIG. 13 illustrates the result of this experiment.

In FIG. 13, the results of the web sites G and H are omitted. In addition, the tendency of the experiment result is different for each web site. For example, in the web site B, in the case where $M_{retrieve}$ is restricted to 100 or 80, the performance of the model in which $M_{filter}$ is set to 40 becomes highest. In addition, in the case where $M_{retrieve}$ is restricted to 60 or less, the performance of the model in which $M_{filter}$ is set to 60 becomes highest.

In contrast, in the web site F, when $M_{retrieve}$ is restricted to 100 or 80, the performance of the model in which $M_{filter}$ is set to 100 becomes highest. In addition, in the case where $M_{retrieve}$ is restricted to 60 or less, the highest $M_{filter}$ is different for each $M_{retrieve}$.

In the above experiment result, it is indicated that an optimal $M_{filter}$ changes depending on both $M_{retrieve}$ and a web site.

From the above, in the actual ad distribution settings, $M_{retrieve}$ is determined by the performance of an initial ad retrieval system, and thereafter it is necessary to adjust $M_{filter}$ for each web site.

According to the embodiment described above, content necessary for a user can be retrieved.

Note that a process according to the embodiment may be realized with software. The software may be distributed by software downloading or the like. In addition, the software may be recorded on a recording medium such as a compact-disc read-only memory (CD-ROM) and distributed. Note that this corresponds to another embodiment of the present specification. Note that software that realizes the information retrieval device according to the embodiment is a program such as that follows. That is, the program is a program that causes a computer capable of accessing a recording medium, which has a degree-of-association information storage unit capable of storing one or more items of degree-of-association information indicating a degree of association between each of one or more items of first information and each of one or more items of second information, to function as an information retrieval device including the following: an accepting unit configured to accept a query including one or more items of query information, the one or more items of query information being one or more items of information used for retrieval of content; a query converter configured to obtain, by using one or more items of first information corresponding to each of the one or more items of query information, and the one or more items of degree-of-association information, one or more items of second information whose degree of association with the one or more items of first information is greater as a predetermined condition is better satisfied; and a retrieval unit configured to retrieve content by using the one or more items of second information obtained by the query converter.

In addition, it is preferable that the program be a program that causes a computer to function as the information retrieval device in which the degree-of-association information storage unit stores a transformation matrix that is a degree-of-association matrix having, as an element, degree-of-association information indicating a degree of association between each of one or more items of first information and each of one or more items of second information; and the query converter obtains a value corresponding to each of one or more items of second information by multiplying a query vector that, the query vector being a vector using the one or more items of query information accepted by the accepting unit, and the transformation matrix, and obtains one or more items of second information corresponding to a value that is greater as the value better satisfies a predetermined condition.

In addition, it is preferable that the program be a program that causes a computer to function as the information retrieval device further including a degree-of-association obtaining unit configured to obtain degree-of-association information between each of one or more items of first information and each of one or more items of second information, from one or more selection logs including one or more items of first information, the one or more items of first information being one or more items of query information, and one or more items of second information associated with selected content; and one or more items of degree-of-association information obtained by the degree-of-association obtaining unit is/are one or more items of degree-of-association information stored in the degree-of-association information storage unit.

In addition, it is preferable that the program be a program that causes a computer to function as the information retrieval device in which the degree-of-association obtaining unit obtains, from the one or more selection logs, a transformation matrix having, as an element, degree-of-association information between each of one or more items of first information and each of one or more items of second information.

In addition, it is preferable that the program be a program that causes a computer to function as the information retrieval device in which the degree-of-association obtaining unit obtains, for each of the one or more items of first information, from the one or more selection logs, a first selectivity that is a selectivity of content corresponding to each of the one or more items of second information, and a second selectivity that is a selectivity of content corresponding to each of the one or more items of first information and each of the one or more items of second information; and the degree-of-association obtaining unit calculates, for each of the one or more items of second information, a ratio between the first selectivity and the second selectivity, and obtains degree-of-association information between first information and second information that is greater as the ratio better satisfies a predetermined condition.

In addition, it is preferable that the program be a program that causes a computer to function as the information retrieval device in which the content is associated with one or more items of to-be-retrieved information, the one or more items of to-be-retrieved information being a set of second information and weight information indicating a weight of the second information; and the retrieval unit retrieves content by using one or more sets of second information and a value, obtained by the query converter.

Figure 14:
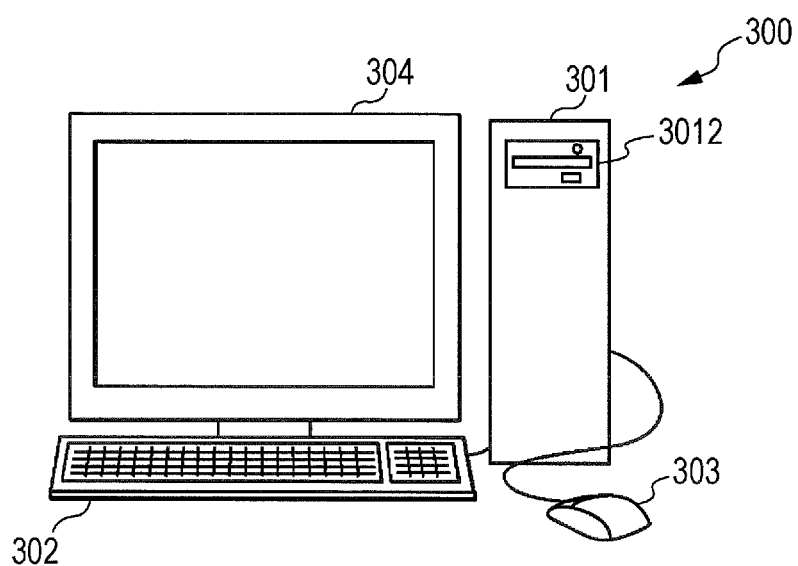
FIG. 14 is a conceptual diagram of a computer system.

In addition, FIG. 14 illustrates an appearance of a computer that executes the program described in the present specification and realizes the information retrieval device according the above-described embodiment. The above-described embodiment may be realized by computer hardware and a computer program executed on the computer hardware. FIG. 14 is a schematic diagram of a computer system 300, and FIG. 15 is a block diagram of the system 300.

In FIG. 14, a computer system 300 includes a computer 301 including a CD-ROM drive 3012, a keyboard 302, a mouse 303, a monitor 304, a microphone 305, and a loudspeaker 306.

Figure 15:
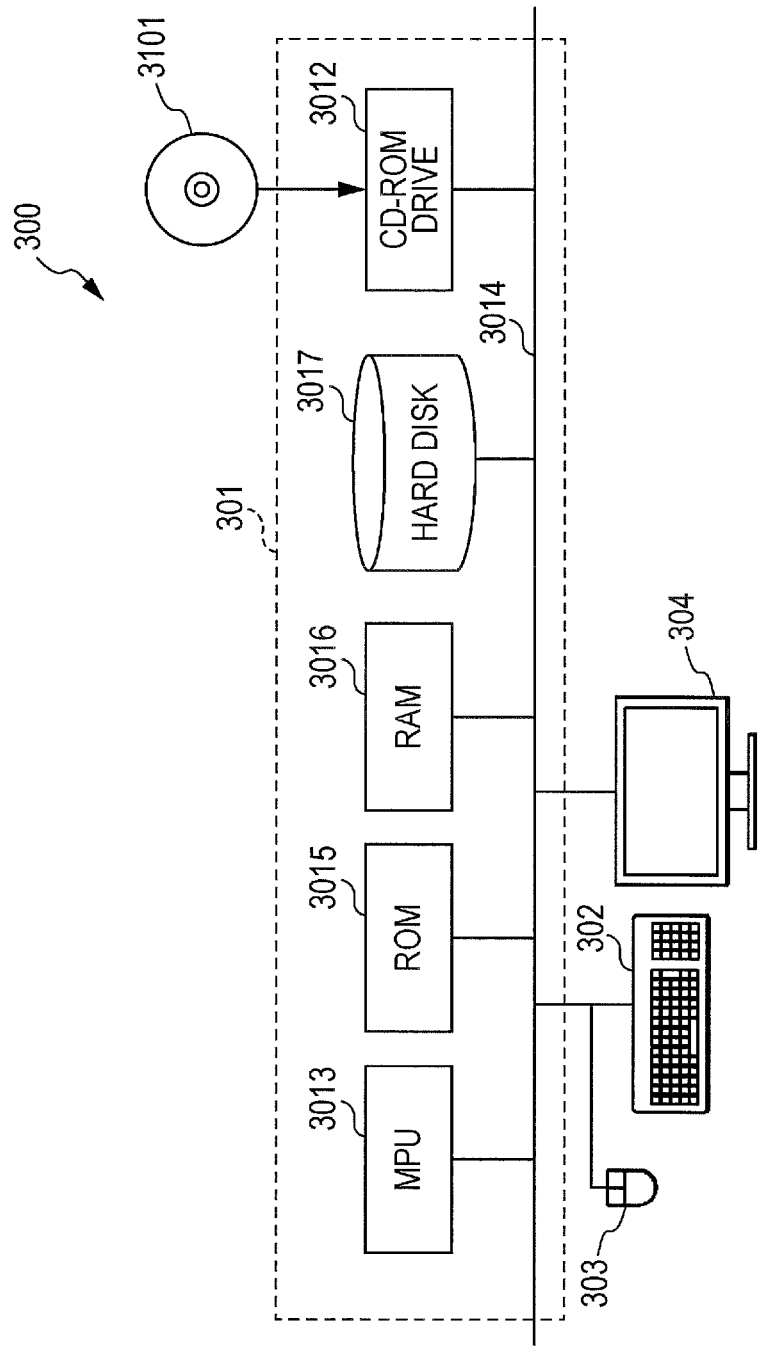
FIG. 15 is a block diagram of the computer system.

In FIG. 15, the computer 301 includes, in addition to the CD-ROM drive 3012, an MPU 3013, a bus 3014, a ROM 3015, a random-access memory (RAM) 3016, and a hard disk 3017. Note that the bus 3014 is connected to the MPU 3013 and the CD-ROM drive 3012. In addition, a program such as a boot-up program is stored in the ROM 3015. In addition, the RAM 3016 is connected to the MPU 3013 and is for temporarily storing a command of an application program and providing a temporarily storage space. In addition, the hard disk 3017 is for storing an application program, a system program, and data. Here, although not illustrated in the drawings, the computer 301 may further include a network card for providing a connection to a local area network (LAN).

A program that causes the computer system 300 to execute the functions of the information retrieval device according to the above-described embodiment may be stored in a CD-ROM 3101, which may be inserted into the CD-ROM drive 3012, and may be transferred to the hard disk 3017. Alternatively, the program may be transmitted to the computer 301 via a network that is not illustrated in the drawings, and may be stored in the hard disk 3017. In execution of the program, the program is loaded to the RAM 3016. The program may be directly loaded from the CD-ROM 3101 or a network.

The program may not necessary include an operating system or a third party program for causing the computer 301 to execute the functions of the information retrieval device according to the above-described embodiment. The program may include only a portion of a command that calls an appropriate function (module) in a controlled mode to obtain a desired result. How the computer system 300 operates is the related art, and a detailed description thereof is omitted.

Note that, in the above-mentioned program, the step of transmitting information and the step of receiving information do not include processing performed by hardware, such as processing performed by a modem or an interface card in the transmitting step (processing that is only performed by hardware).

In addition, the above-mentioned program may be executed by a single computer or multiple computers. That is, centralized processing or distributed processing may be performed.

In addition, in the above-described embodiment, needless to say, two or more communication units included in a single device may be physically implemented by a single medium.

In addition, in the above-described embodiment, individual processes (individual functions) may be implemented through centralized processing performed by a single device (system), or may be implemented through distributed processing performed by a plurality of devices.

The present invention is not limited to the above-described embodiment. Various changes can be made, and, needless to say, these changes are included in the scope of the present invention.

Accordingly, the information retrieval device according to the embodiment of the present invention is capable of retrieving content necessary for a user, and is useful as an ad distribution system or the like.

What is claimed is:

1. An information retrieval device comprising:
   a memory storing one or more selection logs that include: one or more items of first information corresponding to query information, and one or more items of second information associated with selected content; and
   a processor operatively coupled to the memory, the processor being programmed to perform a process including:
      obtaining, from the one or more selection logs, a first selectivity of content corresponding to each of the one or more items of second information;
      obtaining, from the one or more selection logs, a second selectivity of content corresponding to each of the one or more items of first information and each of the one or more items of second information;
      calculating, for each pair of each of the one or more items of first information and each of the one or more items of second information, a matching score between each of the one or more items of first information and each of the one or more items of second information, based on the first selectivity and the second selectivity;
      learning a transformation matrix based on the calculated matching score, the transformation matrix having, as an element, degree of association information indicating a degree of association between each of the one or more items of first information and each of the one or more items of second information;
      accepting a query including one or more items of query information, the one or more items of query information being one or more items of information used for retrieval of content;
      obtaining a value corresponding to each of the one or more items of second information by multiplying a query vector of the accepted one or more items of query information by the learned transformation matrix; and
      retrieving content based on the obtained value corresponding to each of the one or more items of second information.

2. The information retrieval device according to claim 1, wherein:
   the one or more items of first information constitute a first information set, and the first information set is a feature space of a query including one or more items of query information, and
   the one or more items of second information constitute a second information set, and the second information set is a content information space that is a set of information associated with one or more items of content to be retrieved.

3. The information retrieval device according to claim 1, wherein the one or more items of first information constitute a first information set, and the first information set includes user context.

4. The information retrieval device according to claim 1, wherein:
   the content is associated with one or more items of to-be-retrieved information, the one or more items of to-be-retrieved information being a set of second information and weight information indicating a weight of the second information, and
   the processor retrieves content based on the obtained one or more sets of second information and a value.

5. The information retrieval device according to claim 1, wherein the content is an ad.

6. An information retrieval method for use with: (A) a processor, and (B) a memory storing one or more selection logs that include: one or more items of first information corresponding to query information, and one or more items of second information associated with selected content, the method comprising:
   obtaining, by the processor from the one or more selection logs, a first selectivity of content corresponding to each of the one or more items of second information;
   obtaining, by the processor from the one or more selection logs, a second selectivity of content corresponding to each of the one or more items of first information and each of the one or more items of second information;
   calculating, by the processor for each pair of each of the one or more items of first information and each of the one or more items of second information, a matching score between each of the one or more items of first information and each of the one or more items of second information, based on the first selectivity and the second selectivity;
   learning, by the processor, a transformation matrix based on the calculated matching score, the transformation matrix having, as an element, degree of association information indicating a degree of association between each of the one or more items of first information and each of the one or more items of second information;
   accepting, by the processor, a query including one or more items of query information, the one or more items of query information being one or more items of information used for retrieval of content;
   obtaining, by the processor, a value corresponding to each of the one or more items of second information by multiplying a query vector of the accepted one or more items of query information by the learned transformation matrix; and
   retrieving, by the processor, content based on the obtained value corresponding to each of the one or more items of second information.

7. A non-transitory computer-readable recording medium storing a program that causes a computer capable of accessing a memory storing one or more selection logs that include: one or more items of first information corresponding to query information, and one or more items of second information associated with selected content to:
   obtain, from the one or more selection logs, a first selectivity of content corresponding to each of the one or more items of second information;
   obtain, from the one or more selection logs, a second selectivity of content corresponding to each of the one or more items of first information and each of the one or more items of second information;
   calculate, for each pair of each of the one or more items of first information and each of the one or more items of second information, a matching score between each of the one or more items of first information and each of the one or more items of second information, based on the first selectivity and the second selectivity;

learn a transformation matrix based on the calculated matching score, the transformation matrix having, as an element, degree of association information indicating a degree of association between each of the one or more items of first information and each of the one or more items of second information;

accept a query including one or more items of query information, the one or more items of query information being one or more items of information used for retrieval of content;

obtain a value corresponding to each of the one or more items of second information by multiplying a query vector of the accepted one or more items of query information by the learned transformation matrix; and retrieve content based on the obtained value corresponding to each of the one or more items of second information.

* * * * *